United States Patent [19]

Gagnon

[11] Patent Number: 5,650,851
[45] Date of Patent: Jul. 22, 1997

[54] SPECKLE INTERFERENCE METHOD FOR REMOTE THICKNESS MEASUREMENT OF A SHEET AND LAYER AND AN APPARATUS THEREFOR

[75] Inventor: Robert E. Gagnon, St. John's, Canada

[73] Assignee: National Research Council of Canada, Ottawa, Canada

[21] Appl. No.: 494,525

[22] Filed: Jun. 26, 1995

[51] Int. Cl.$^6$ .................................................. G01B 9/02
[52] U.S. Cl. ........................ 356/355; 356/345; 356/357
[58] Field of Search .................................. 356/345, 355, 356/357

[56] References Cited

U.S. PATENT DOCUMENTS

| | | | |
|---|---|---|---|
| 4,660,980 | 4/1987 | Takabayashi et al. | 356/357 |
| 5,276,501 | 1/1994 | McClintock et al. | 356/357 |

Primary Examiner—Frank Gonzalez
Assistant Examiner—Robert Kim
Attorney, Agent, or Firm—Neil Teitelbaum & Associates

[57] ABSTRACT

A method and an apparatus are disclosed for remotely determining the thickness of a transparent or semi-transparent suspended sheet or solid or liquid layer, e.g. ice, on a solid surface which is either light-absorbent or highly reflective. The invention proposes directing a coherent beam of light onto a location on the layer such that the beam undergoes partial reflection from the top of the layer and partial reflection from the bottom of the layer or the underlying surface. Due to the coherency of the beam, two overlapping speckle patterns are produced which give rise to an interference pattern having interference fringes. The pattern can be caused to shift across the field of view and the shift, determined by a number of the passing interference fringes can be interpreted in terms of the thickness of the layer.

12 Claims, 2 Drawing Sheets

1

SPECKLE INTERFERENCE METHOD FOR REMOTE THICKNESS MEASUREMENT OF A SHEET AND LAYER AND AN APPARATUS THEREFOR

FIELD OF THE INVENTION

This invention relates to a remote measurement of the thickness of a sheet or a layer of substantially transparent material, e.g. a liquid, ice or plastic, on a solid surface, or a suspended solid sheet or layer. Specifically, the invention is concerned with a remote measurement of ice thickness, up to several millimeters, on a solid surface, such as an aircraft wing or a road surface, or for quality control in industrial applications where transparent or semi-transparent coatings are applied to solid surfaces or where a suspended sheet of material is produced.

BACKGROUND OF THE INVENTION

Several techniques exist for ice detection and thickness measurement. The related hardware is either mechanical, acoustical or optical in nature. U.S. Pat. No. 5,400,144 of the present inventor (Method and Apparatus for Remote Detection and Thickness Measurement of Ice or Liquid Layer) describes an optical method incorporating a laser and a sensor (video camera or diode array) to produce a certain pattern on the surface due to internal reflection of the laser light within the solid or liquid layer measured. The image obtained by the sensor, and in particular the diameter of illuminated zones, can be interpreted in terms of the thickness of the layer. The technique is best suited to light colored surfaces and layer thicknesses from 500 µm to several centimeters. It is not as effective on dark surfaces or polished (or semi-polished) metallic surfaces.

SUMMARY OF THE INVENTION

The above-mentioned method of U.S. Pat. No. 5,400,144 requires calibration for layer thicknesses less than about 500 µm, and is not optimally effective for dark-colored or semi-polished metal surfaces. It is an object of the present invention to provide a method for remote, relatively precise thickness determination of liquid layers or certain solid layers or sheets on dark or semi-polished (i.e. radiation-absorbing to a significant degree) metallic surfaces, or suspended solid layers or sheets, and for layer thicknesses from several millimeters to below 500 µm, if the geometry of the underlying surface is well defined.

For the purpose of this specification, the term "layer" hereinafter encompasses also a sheet.

According to the invention, there is proposed a method of remotely determining the thickness of a transparent or semi-transparent layer of a liquid or a solid, the method comprising the steps of:

a) irradiating a location on the layer with at least one beam of coherent light, b) allowing a part of the beam to reflect off of the top of the layer at the irradiated location to produce a first speckle pattern in a field of view, and allowing another part of the beam to pass through the layer and reflect off of the bottom of the layer to produce a second speckle pattern in said field of view, in a manner for the first and second speckle patterns to produce, due to overlapping, an interference pattern in said field of view, the pattern defining interference fringes;

c) changing a parameter of the beam, the parameter being such that a change thereof causes a change of the optical length of the beam within the material of the layer and thus causes the interference pattern to move across said field of view by a number of the interference fringes, and d) determining the number of the interference fringes of step c), the number being indicative of a thickness of the layer.

The interference fringes can be counted by viewing the interference pattern with a sensor or detector, e.g. defocused video camera, a diode sensor, an array of diode sensors or another suitable viewing device.

The thickness of the layer can then be estimated or calculated from the number of interference fringes that have passed, or moved, through the field of view as a result of the parameter change, using geometric principles as described below.

An exemplary parameter a change of which can produce the interference effect of the invention is the angle of incidence of the coherent beam of light.

Another exemplary parameter of the invention is the wavelength of the coherent beam.

According to another aspect of the invention there is provided a system for remotely determining the thickness of a transparent or semi-transparent layer of a liquid or a solid, the system comprising:

a) means for irradiating a location on the layer with a beam of coherent light in a manner to produce two overlapping speckle patterns with a resulting interference pattern in a field of view, the pattern defining interference fringes, b) means for changing a parameter of the beam, the parameter being such that a change thereof causes the interference pattern to move across the field of view by a number of the interference fringes, and c) means for determining the number of the interference fringes that move across the field of view as a result of the parameter change.

Exemplary parameters of the beam have been mentioned hereinabove.

BRIEF DESCRIPTION OF THE DRAWINGS

Exemplary embodiments of the invention will be described in conjunction with the drawings in which.

DETAILED DESCRIPTION OF THE INVENTION

The instant invention utilizes two well known optical phenomena, speckle and interference.

Figure 1:
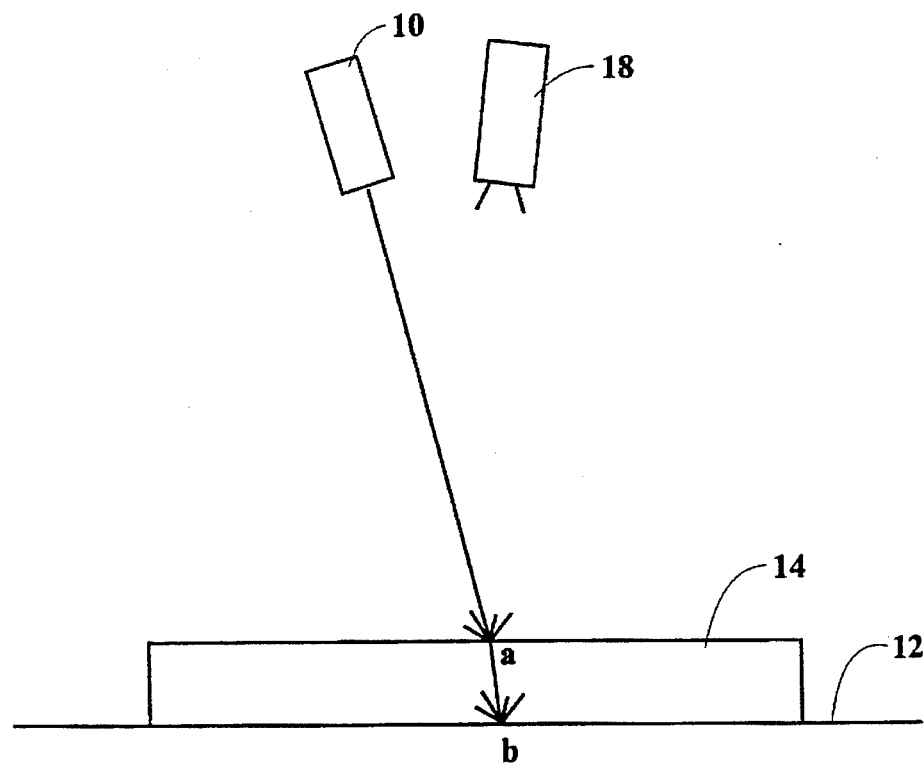
FIG. 1 is a schematic diagram of one embodiment of a detection system of the invention.

Referring now to FIG. 1 which illustrates an embodiment of the system of the invention with a layer of material on a solid surface, a laser 10 is shown positioned at a distance from a target surface 12 of interest, the surface 12 having a partly transparent layer 14 thereon. A coherent beam of light 16, of any wavelength, is generated by the laser 10 and is directed onto a spot a on the layer 14. Due to partial reflectivity of the material of the layer, e.g. ice, a fraction of the beam 16 is diffusely reflected from the spot a. A portion of the beam refracts through the layer 14 and strikes the bottom of the layer 14, and the underlying target surface 12 at a spot b. At least part of the portion of the beam is diffusely reflected from the spot b. Each of the spots a and b will produce its own speckle pattern due to the coherence of the laser light, the speckle patterns overlapping at least partly to create an observable interference pattern in a field of view.

A sensor 18, for example a defocused video camera, or a diode sensor, or an array of diode sensors, is positioned at a distance from the target surface 12 such as to detect the interference pattern.

If the color of the surface is dark (absorbent) to a certain degree, so as to absorb a substantial portion of the light impinging on it, then the intensity of the light reflected from the surface will be comparable to the intensity of the light reflected from the layer. The interference pattern will be detectable as long as the intensities of the overlapping speckle patterns are not so different as to make one pattern completely dominate what is detected by the sensor.

For this condition to be met, the surface under determination should either be dark (absorbent) to begin with, or the surface can be prepared by putting dark paint on an area of the surface, or by using a small piece of dark-colored adhesive tape. The desired conditions are also present if the surface is a fairly good specular reflector (i.e. clean metal surface). In the latter case, a major portion of the light is specularly reflected from the surface, not in the direction of the sensor, and a small amount only is diffusely reflected to the sensor.

Figure 2:
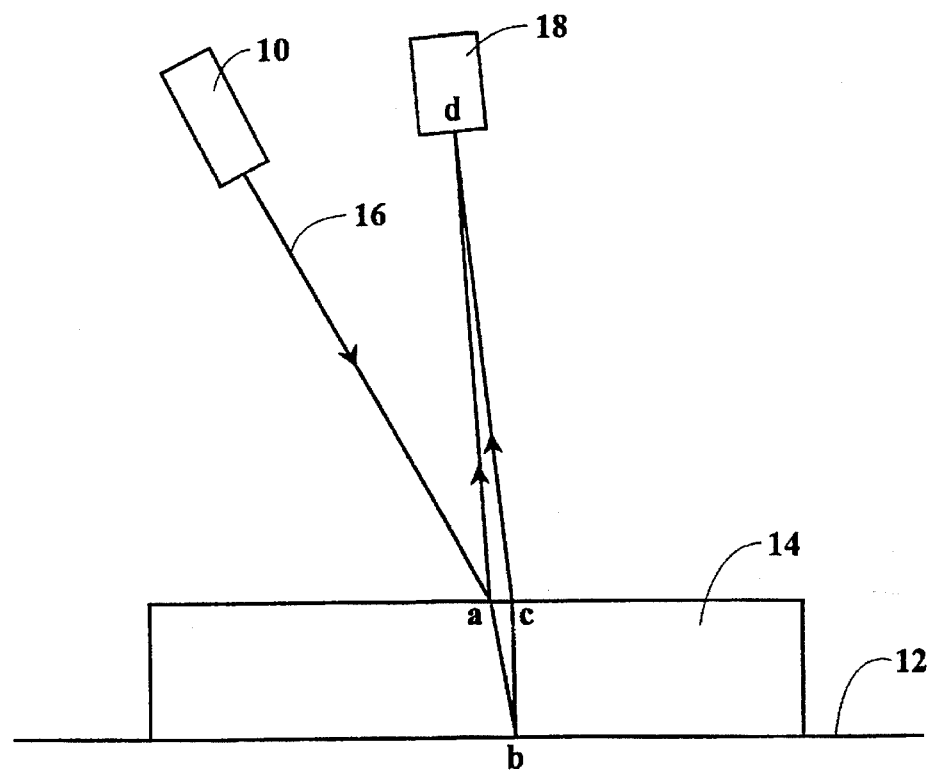
FIG. 2 is a schematic diagram of the detection system of FIG. 1, illustrating the optical path of the beam of light.

As shown in FIG. 2, the beam 16 irradiated by the laser 10 strikes the layer 14 at a spot a and undergoes partial reflection whereby a portion of the reflected rays reaches the sensor 18. Another portion of the beam 16 passes (refracts) through the layer 14, reaches the spot b, undergoes partial reflection and refraction through the layer 14, meets the layer-air interface at a spot c and reaches the sensor 18 at a point d.

In FIGS. 1 and 2, the sensor 18 is shown as positioned away from the laser. This produces an optical path of the beam as shown in FIG. 2, since the path length through the air for the rays reflected from the top and bottom of the layer, respectively, may be slightly different (ad≠cd), assuming that the top surface of the layer 14 is not normal to the view direction of the sensor 18.

If, conversely, the sensor 18 is placed in the same line of sight as the laser 10 (FIG. 3), which is the likely scenario for most applications, including ice detection, the path length through the air for the rays reflected from the top (a) and the bottom (b) of the layer 14 are the same (i.e.ad=cd).

It will be appreciated that the invention applies also to thickness measurement of a suspended sheet. For such a scenario, not illustrated herein, the beam would still reflect, at least partly, from the top and bottom of the suspended sheet to produce, in appropriate conditions, the above-described interference pattern.

Figure 3:
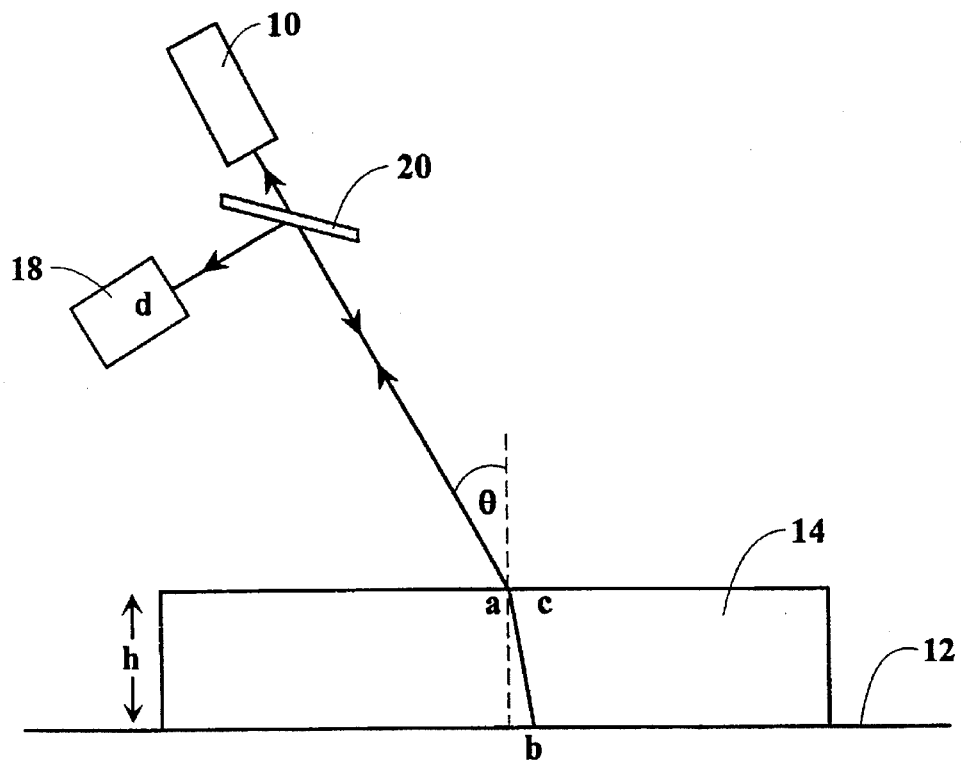
FIG. 3 is a schematic diagram of an alternative embodiment of a detection system in accordance with this invention, illustrating the optical path of the light beam.

In FIG. 3, a partial mirror 20 is positioned in the path of the beam generated from the laser 10 such that the beam is transmitted through the mirror 20 and reaches the spot a on the layer 14 at an incidence angle θ, partly refracts through the layer 14, is reflected from the surface 12 at the spot b, reflects from the mirror 20 and reaches the sensor 18 at a spot d. Due to the arrangement of the laser and the sensor in the same line of sight, the optical path length through the air for the rays reflected from the top and bottom of the layer 14 are the same (i.e. ad−cd=0). Since the spots a and c now coincide, the length abc equals 2ab.

Figure 4:
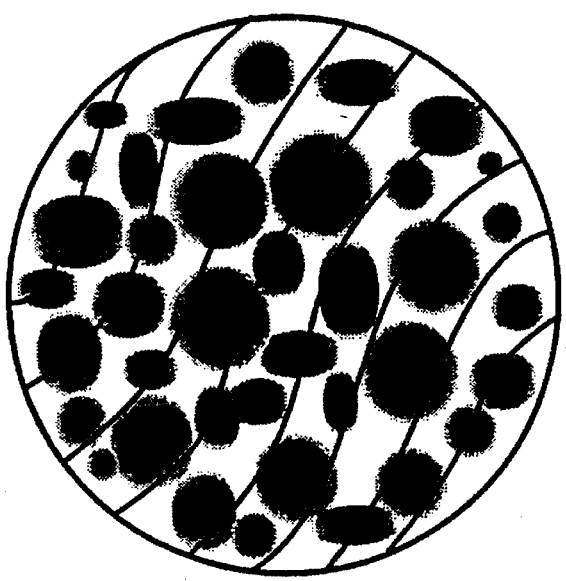
FIG. 4 is an exemplary pictorial view of an overlapping speckle pattern with interference.

The distinctiveness of the interference pattern, that is, the wavy lines shown in FIG. 4, will be enhanced if the incident laser beam is focused to a small diameter (≦1 mm) on the surface (note that there can be a high degree of variability between images of the overlapping speckle patterns, depending on the details of the setup). The laser beam can be focused to this diameter using an appropriate lens or lenses. Commercially available diode lasers and optical assemblies can provide focused laser beams at distances ranging from zero to greater than 15 meters. However, even when the laser beam diameter is large on incidence (several millimeters), the method still achieves its objective. The laser and sensor can be positioned at a large distance (several meters) from the surface/layer of interest.

The thickness of the layer may be determined, as mentioned above, by changing a parameter of the beam, such that a change of the parameter changes the optical path of the beam within the material of the layer. One such parameter is the angle of incidence of the beam, provided that the beam strikes the layer 14 at the same spot. Since a change of the angle of incidence changes the optical path length of the beam in the material of the layer 14, the interference pattern will shift by a certain number of interference orders, or fringes that will pass across the field of view. The number of fringes will depend on the measured change of the angle of incidence, the known refractive index of the material of the layer and its thickness. For example, with a setup such as that in FIG. 3, a mathematical formula defining this relationship can be presented:

$$h = \frac{\lambda F_{number}}{2n} \left[ \left( \cos\left( \sin^{-1}\left( \frac{\sin \theta_1}{n} \right) \right) \right)^{-1} - \left( \cos\left( \sin^{-1}\left( \frac{\sin \theta_2}{n} \right) \right) \right)^{-1} \right]^{-1}$$

where h is the thickness of the layer, n is the refractive index of the layer material, λ is the wavelength of the laser light, and $F_{number}$ is the number of fringes counted as the angle of incidence is changed continuously from $\theta_1$ to $\theta_2$.

However, it is not easy nor desirable to change the angle of incidence of the beam, particularly where the surface of interest is at a considerable distance from the laser (e.g. more than two meters), or where the layer is not of uniform thickness. Therefore, a second approach to changing the optical path length in the layer is to change another parameter of the beam, namely the wavelength of the light. The wavelength change can be accomplished by using a dye laser or a diode laser. Commercially available compact tunable dye lasers and tunable diode lasers can produce a beam of light (visible or other wavelength) the wavelength of which can be continuously altered by 50 nm or more (approximately 10% of the nominal wavelength) for the dye lasers, and about 15 nm for the diode lasers. Hence, by changing the wavelength of the incident light by a fixed amount, say 5%, one changes the optical path length of the light that travels in the layer 14 i.e. to the underlying surface 12 (a to b in FIG. 2) and back to the layer/air interface (b to c). The number of interference fringes that will move across the field of view as a result of the wavelength change will depend on the known value of the wavelength change, the known refractive index of the layer material and the thickness of the layer. The number of passing interference fringes can be measured as described hereinabove.

If a CCD video camera is used as the sensor 18, then a digital image processing algorithm could be used to determine the number of passing fringes. Alternatively, light intensity can be measured in a small area in the field of view using e.g. a photodiode. Oscillations in the output of the photodiode would correspond to the passage of interference fringes. The oscillations can be counted using a known method, e.g. a digital electronic circuit.

Based on FIG. 2, the general formula for the number of interference fringes that go by the field of view for a given change in wavelength of the laser light can be given as $$(abc\, n + (ad - cd)) \left( \frac{1}{\lambda} - \frac{1}{\lambda - \delta} \right) = F_{number}$$

where abc is the geometric path length of the light through the layer 14, n is the refractive index of the layer material, ad and cd are the path lengths through air for the rays diffusely reflected from the top and bottom of the layer respectively, $\lambda$ is the wavelength of the laser light, $\delta$ is the change in wavelength and $F_{number}$ is the number of fringes counted as the wavelength of the light is continuously altered by a predetermined amount.

The above formula applies if the laser and the sensor are not close (not in the same line of sight), and consequently, if the path length through the air of the rays reflected from the top and bottom of the layer 14 is somewhat different (ad≠cd), assuming that the top surface of the layer is not normal to the direction of view of the sensor (see FIG. 2).

Alternatively, as shown in FIG. 3, by arranging the laser and sensor so that they are near each other or in the same line of sight, the path length through the air for the rays reflected from the top and bottom of the layer are the same and all the fringes that pass across the field of view are attributable to the change in optical path length within the layer. Since a and c now coincide (abc=2ab), the expression above is simplified to yield $$ab = \frac{F_{number}}{2n} \left( \frac{1}{\lambda} - \frac{1}{\lambda - \delta} \right)^{-1}$$

Hence the thickness of the layer, h, is given by the formula $$h = (ab)\cos\left( \sin^{-1}\left( \frac{\sin\theta}{n} \right) \right)$$

where $\theta$ is the angle of incidence of the laser beam.

If the surface of the layer 14 exhibits some waviness or bumpiness (unevenness), then a number of fringe counts can be made, each taken after the laser beam has been moved slightly on the surface. The average value of all these fringe counts will give a value of abc that reduces the effect of the bumpiness of the surface.

As mentioned, the layer may be solid or liquid. If it is liquid, it is desirable that its thickness be constant during the measurement. Ripples on the surface will disturb the measurements, therefore vibrations should be minimized. If the liquid is viscous (e.g. deicing fluid), the ripple-producing effect of vibration will be reduced. Rapidly changing the wavelength of the laser, and thereby shortening the measurement time interval, also reduces the effect of changes in liquid thickness.

In situations where the thickness of the layer is unavoidably changing during the measurement, two systems can be used, operating at different wavelenghts and equipped with interference filters so that each detects only the light from its laser. The systems would be located close to each other and the laser beams would impinge on the same spot on the surface with the layer. The wavelength of the light from one of the systems will be varied while the other has fixed wavelength. The thickness measurement is effected in a similar manner as above, that is, the wavelength of the variable laser is changed and the corresponding number of fringes is counted. However, if the thickness of the layer is also changing as the measurement is made, then the system with the fixed laser wavelength will detect a number of the fringes corresponding to the change in optical path length in the layer. This number of fringes, when adjusted to account for the wavelength difference between the systems, can be subtracted from the fringe number detected by the variable system.

Also, a number of fringes equivalent to that which would have been counted if the variable system had been measuring a layer with an optical path equal to one half the change of the optical path in the liquid layer due to the change in its thickness, would need to be subtracted from the fringe count of the variable system. This assumes that the rate of liquid thickness change during the measurement interval was constant.

These two operations will eliminate the effect of the change in the thickness of the liquid during the measurement and yield the thickness of the liquid at the beginning of the measurement time interval.

It will be appreciated that the detailed steps in this embodiment follow from the basic method of the invention. The two beams, of different wavelength, strike the same location on the layer; the wavelength (or angle of incidence) of one of the beams is changed and the fringes of the corresponding interference pattern are counted; the other beam, of constant wavelength, produces an interference pattern which moves because of varying thickness of the layer; and the fringe counts are interpreted to determine the thickness of the layer at a point in time.

Consequently, a modified apparatus (not illustrated) for the purpose of determining a varying thickness of a layer may comprise two (or more) means for irradiating the layer, the means producing two separate beams of light of different wavelength. The apparatus may comprise means for changing the wavelength of one of the beam (or its angle of incidence). The resulting two interference patterns would be monitored by way of two separate sensors or other means, and the corresponding two readings of the number of fringes can be interpreted in terms of the thickness of the layer.

It will be appreciated that the method and apparatus of the invention enable relatively precise thickness measurements ranging from very thin layers to layers up to several centimeters in thickness, if reasonably transparent. The method does not require significant modifications to the surface measured, nor electrical connections to the surface.

Numerous embodiments of the invention may be envisaged without departing from the spirit and scope of the invention, such scope to be determined by the appended claims.

We claim:

1. A method of remotely determining the thickness of a transparent or semi-transparent layer of a liquid or a solid, the method comprising the steps of:
   a) irradiating a location on the layer with a beam of coherent light,
   b) allowing a part of said beam to reflect off of the top of said layer at the irradiated location to produce a first speckle pattern in a field of view at said location, and allowing another part of said beam to pass through said layer and reflect off of the bottom of said layer to produce a second speckle pattern in said field of view, in a manner for said first and second speckle patterns to produce, due to overlapping, an interference pattern in said field of view;

c) changing a parameter of said beam, the parameter being such that a change thereof causes a change of optical path of said beam within said layer and thus causes the interference pattern to move across said field of view by a number of interference fringes, and d) determining the number of said interference fringes of step c), the number being indicative of a thickness of the layer.

2. The method according to claim 1 wherein the parameter is the angle of incidence of said beam.

3. The method according to claim 1 wherein the parameter is the wavelength of the light.

4. The method according to claim 1 further comprising the step of calculating the thickness of said layer from said number of said interference fringes.

5. The method according to claim 1 wherein the step d) is performed by viewing said pattern with a defocused video camera.

6. The method according to claim 1, further comprising, varying said location on said layer and repeating step d) a number of times to reduce the effect of unevenness of said surface.

7. A method of remotely determining the thickness of a transparent or semi-transparent layer of a liquid or a solid, the method comprising the steps of:

a) irradiating a location on the layer with a first beam of coherent light, b) allowing a part of said first beam to reflect off of the top of said layer at the irradiated location to produce a first speckle pattern in a field of view at said location, and allowing another part of said first beam to pass through said layer and reflect off of the bottom of said layer to produce a second speckle pattern in said field of view, in a manner for said first and second speckle patterns to produce, due to overlapping, a first interference pattern in said field of view;

c) irradiating said location on the layer with a second beam of coherent light of a different wavelength than that of said first beam, d) allowing a part of said second beam to reflect off of the top of said layer at the irradiated location to produce a third speckle pattern in a field of view at said location, and allowing another part of said second beam to pass through said layer and reflect off of the bottom of said layer to produce a fourth speckle pattern in said field of view, in a manner for said third and fourth speckle patterns to produce, due to overlapping, a second interference pattern in said field of view;

e) varying the optical path of said first beam through the layer to cause said first interference pattern to move across said field of view by a number of interference fringes, f) determining the number of interference fringes of step e), g) determining the number of interference fringes of said second interference pattern that move across said field of view as a result of a change of thickness of said layer, h) determining the thickness of said layer by adjusting the number of fringes of step f) using the number of fringes of step g).

8. A system for remotely determining the thickness of a transparent or semi-transparent layer of a liquid or a solid, the system comprising:

a) means for irradiating a location on the layer with a beam of coherent light in a manner to produce two overlapping speckle patterns with a resulting interference pattern in a field of view, the pattern defining interference fringes, b) means for changing a parameter of the beam, the parameter being such that a change thereof causes a change of optical path of said beam within said layer and thus causes said interference pattern to move across the field of view by a number of said interference fringes, and c) means for determining the number of the interference fringes which move as a result of the parameter change.

9. The system according to claim 8 wherein said means for changing a parameter of the beam is a means for changing the wavelength of said light.

10. The system according to claim 8 wherein the means for irradiating said location is a dye laser or a diode laser.

11. The system according to claim 8 wherein said means for changing a parameter of said beam is a means for changing the angle of incidence of said beam on said layer.

12. The system according to claim 8 wherein said means for irradiating said location and said means for determining the number of the interference fringes are disposed in substantially the same line of sight.

* * * * *